United States Patent [19]

Dittenhöfer

[11] Patent Number: 6,004,038
[45] Date of Patent: Dec. 21, 1999

[54] ECCENTRIC BEARING WITH ADJUSTMENT LEVER

[75] Inventor: Thomas Dittenhöfer, Riedbach, Germany

[73] Assignee: SKF GmbH, Schweinfurt, Germany

[21] Appl. No.: 09/007,066

[22] Filed: Jan. 14, 1998

[30] Foreign Application Priority Data

Jan. 15, 1997 [DE] Germany .................. 297 00 575 U

[51] Int. Cl.⁶ .............. F16C 19/50; B41F 7/02; B41F 13/24
[52] U.S. Cl. ................ 384/447; 101/218; 101/247
[58] Field of Search .............. 384/447; 403/374.4, 403/374.3, 374.2, 373, 370; 101/218, 247, 184, 185, 192, 137, 143, 145

[56] References Cited

U.S. PATENT DOCUMENTS

| | | | |
|---|---|---|---|
| 2,568,761 | 9/1951 | Peyrebrune | 101/218 |
| 2,578,700 | 12/1951 | Harrold et al. | 101/218 |
| 2,711,935 | 6/1955 | Miles | 384/255 |
| 2,986,086 | 5/1961 | Siebke | 101/218 |
| 3,467,450 | 9/1969 | Schmidt et al. | 384/447 |
| 3,691,956 | 9/1972 | James et al. | 101/247 |
| 3,769,910 | 11/1973 | Heimlicher et al. . | |
| 3,786,749 | 1/1974 | Vir Singh | 101/247 |
| 4,538,336 | 9/1985 | Oliver . | |
| 4,798,149 | 1/1989 | Hoffmann | 384/447 X |
| 5,234,270 | 8/1993 | Mathes . | |
| 5,458,427 | 10/1995 | Simond | 403/370 X |
| 5,692,865 | 12/1997 | Pratt | 403/370 X |
| 5,740,736 | 4/1998 | Toyoda | 101/218 |

FOREIGN PATENT DOCUMENTS 41 26 545  11/1994  Germany .

Primary Examiner—Tamara L. Graysay
Assistant Examiner—Brandon C. Stallman
Attorney, Agent, or Firm—Burns, Doane, Swecker & Mathis, L.L.P.

[57] ABSTRACT

An eccentric bearing includes inner and outer race rings, an eccentric ring positioned between the inner and outer race rings, two spaced apart rows of roller elements positioned between the inner race ring and the eccentric ring, and two spaced apart rows of roller elements positioned between the eccentric ring and the outer race ring. An adjustment lever is positioned adjacent one side surface of the eccentric ring and is mounted on a link pin that is positioned in a bore in the eccentric ring. The link pin is axially fixed in place by a tie bolt that extends through the bore in the eccentric ring. The link pin includes a conically shaped mantle surface that engages a correspondingly shaped portion of the bore in the eccentric ring, thus achieving a tight seat with a large surface at the point most at risk, i.e., the point where the link pin exits at the side surface of the eccentric ring.

14 Claims, 1 Drawing Sheet

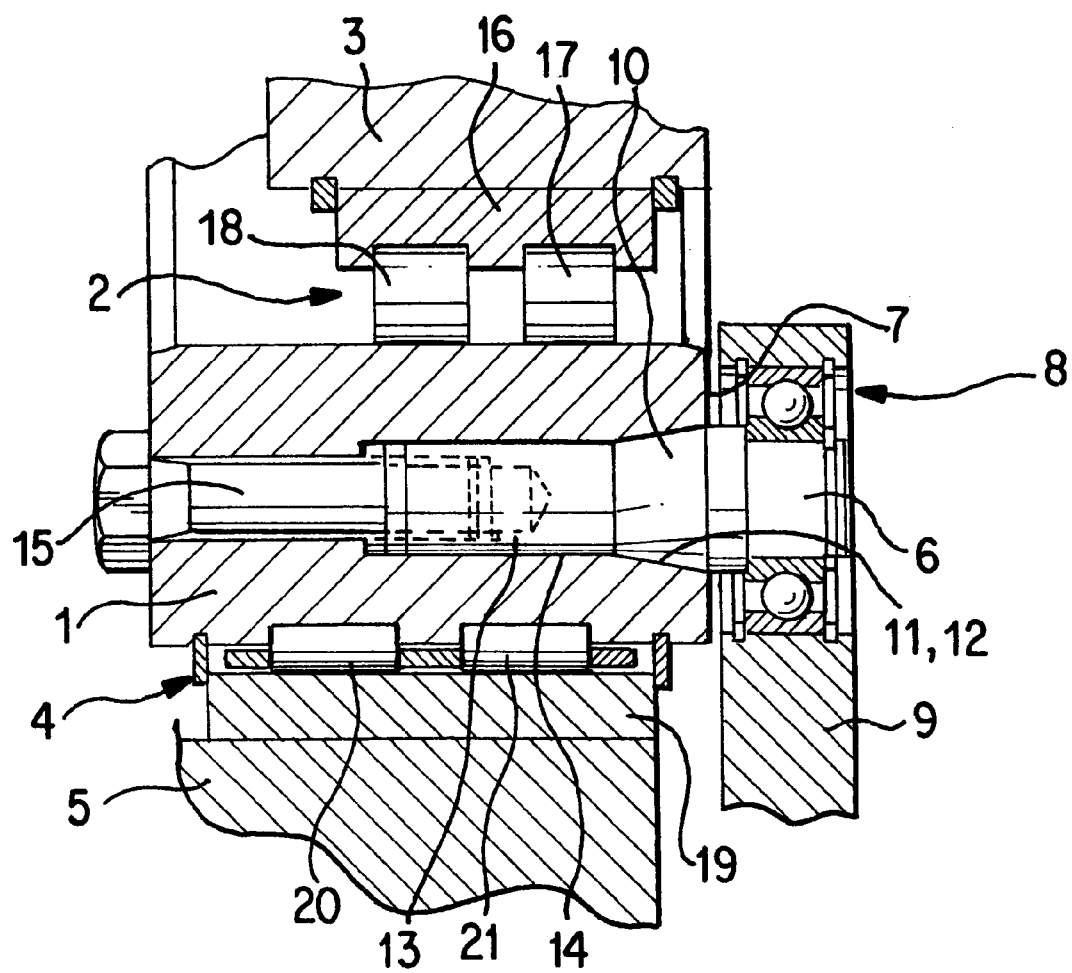

ECCENTRIC BEARING WITH ADJUSTMENT LEVER

FIELD OF THE INVENTION

The present invention generally relates to a bearing. More particularly, the present invention pertains to an eccentric bearing provided with an adjustment lever.

BACKGROUND OF THE INVENTION

DE 41 26 545 describes an eccentric bearing for printing machines in which a middle ring is constructed as an eccentric ring for carrying the bearing races for each roller bearing positioned radially inside and for each roller bearing positioned radially outside. At the side surface of the eccentric ring, a link pin for an adjustment lever is attached with a screw. During operation of the machine, the adjustment lever must absorb high forces and these forces are applied to the screw. There exists the risk that the relatively thin screw will become loosened by the bending stress in the thread windings of the eccentric ring. Also, the screw is susceptible to being sheared off as a result of fatigue in the area of the side surface.

SUMMARY OF THE INVENTION

A need thus exists for an eccentric bearing in which the joint between the adjustment lever and the eccentric ring is improved so that loosening or failure is prevented.

According to one aspect of the present invention, an eccentric bearing includes inner and outer race rings, an eccentric ring positioned between the inner and outer race rings, two spaced apart rows of roller elements positioned between the inner race ring and the eccentric ring, and two spaced apart rows of roller elements positioned between the eccentric ring and the outer race ring. An adjusting lever is positioned adjacent one side surface of the eccentric ring and is mounted on a link pin that is positioned in a bore in the eccentric ring. The link pin is axially fixed in place by a tie bolt that extends into the bore in the eccentric ring. The link pin includes a conically shaped mantle surface that engages a correspondingly shaped portion of the bore in the eccentric ring, thus achieving a tight seat with a large surface at the point most at risk, i.e., the point where the link pin exits at the side surface of the eccentric ring. The diameter of the link pin in the region of the conical mantle surface and in the direction of the adjustment lever increases which results in greater rigidity. The seating of the conical mantle surface is achieved with the tie bolt and the thread need not absorb transverse forces so that there is little risk of a notch effect or shearing off.

According to another aspect of the invention, the eccentric bearing includes an intermediately located eccentric ring provided with a bore, a portion of which is conically shaped. Two rows of roller elements are arranged radially inwardly and radially outwardly of the eccentric ring, and a link pin is positioned in the bore in the eccentric ring, with the link pin being provided with a conically shaped mantle surface. An adjusting lever is mounted on the link pin and is positioned adjacent one side surface of the eccentric ring. A device is provided for axially fixing the link pin in the bore in the eccentric ring so that the conically shaped mantle surface of the link pin engages the conically shaped portion of the bore in the eccentric ring.

BRIEF DESCRIPTION OF THE DRAWING FIGURE

The foregoing and additional features and characteristics of the present invention will become more apparent from the following detailed description considered with reference to the accompanying drawing FIGURE which is a partial longitudinal cross-sectional view of a portion of an eccentric bearing for a printing roller illustrating the connected adjustment lever.

DETAILED DESCRIPTION OF THE INVENTION

As illustrated in the drawing FIGURE, the eccentric bearing assembly of the present invention includes a centrally located shaft pin 3 and a frame 5 located radially outwardly of the shaft pin 3. Positioned between the shaft pin 3 and the frame 5 is the eccentric bearing.

The eccentric bearing includes a middle ring constructed as an eccentric member or sheath 1, a radially inwardly located two-row cylinder roll bearing 2 and a radially outwardly located two-row cylinder roll bearing 4. The inner race ring 16 of the inner two-row cylinder roll bearing 2 is mounted on the shaft pin 3 with two spaced apart rows of rollers 17, 18 being located between the inner race ring 16 and the eccentric ring 1. The outer race ring 19 of the radially outer tworow cylinder roll bearing 4 is set into or mounted in the frame 5 with two spaced apart rows of rollers 20, 21 being located between the outer race ring 19 and the eccentric ring 1.

The eccentric ring 1 is provided with a bore or through hole, and a link pin 6 is positioned in the bore at the point of greatest wall thickness of the eccentric ring 1. The end of the link pin 6 projects beyond the side surface 7 of the eccentric ring 1. This projecting end of the link pin 6 is connected via a roller bearing 8 with the eye or attachment point of an adjustment lever 9.

Immediately adjacent the projecting end of the link pin 6 is a conically shaped portion 10 of the link pin 6. This cone portion 10 of the link pin 6 is located within the through hole in the eccentric ring 1 and possesses a conically shaped mantle surface 11 that is fitted into a correspondingly configured conical bore portion 12 of the bore in the eccentric ring 1. The mantle surface 11 increases in size (i.e., diameter) towards the adjustment lever 9. A cylindrical shaft portion 13 of the link pin 6 located immediately adjacent the cone portion 10 is positioned within and guided by a correspondingly configured cylindrical bore portion 14 of the bore in the eccentric ring 1. The shaft portion 13 of the link pin 6 is provided with an internal thread that threadably receives a threaded tie bolt 15. The tie bolt 15 is inserted from the side of the eccentric ring 1 located opposite the adjustment lever 9. This tie bolt 15 ties down and secures the link pin 6 within the bore in the eccentric ring 1 so that the conical mantle surface 11 of the link pin 6 engages the conical bore portion 12 of the bore in the eccentric ring 1.

Because the link pin 6 is secured in place by virtue of the conically shaped mantle surface 11 of the link pin 6 engaging the correspondingly configured conical bore portion 12 in the eccentric ring 1 and by virtue of the tie bolt 15 which axially fixes the link pin 6, a tight seat is achieved with a large surface at the point most at risk, i.e., where the link pin exits at the side surface of the eccentric ring. Also, the diameter of the link pin in the sense of the cone angle in the direction of the adjustment lever increases, and this increased cross section results in greater rigidity. Further, because the seating is achieved with the tie bolt, the thread need not absorb transverse forces and so there is little risk of a notch effect or shearing off. Thus, potential loosening and failure are prevented by virtue of the eccentric bearing assembly construction of the present invention.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. Eccentric bearing comprising:

an inner race ring;

an outer race ring;

an eccentric ring positioned between the inner and outer race rings;

two spaced apart rows of roller elements positioned between the inner race ring and the eccentric ring;

two spaced apart rows of roller elements positioned between the eccentric ring and the outer race ring;

an adjustment lever positioned adjacent one side surface of the eccentric ring, said adjustment lever being mounted on a link pin that is positioned in a bore in the eccentric ring, the link pin being axially fixed in place by a tie bolt extending through the bore in the eccentric ring, the bore in the eccentric ring including a conically shaped bore portion, the link pin including a conically shaped mantle surface that engages the conically shaped bore portion.

2. Eccentric bearing as claimed in claim 1, wherein said link pin is inserted into the bore from one side of the eccentric ring and the tie bolt is inserted into the bore from a side of the eccentric ring opposite said one side of the eccentric ring.

3. Eccentric bearing as claimed in claim 2, wherein said adjustment lever is connected, via a roller bearing, to an end of the link pin projecting beyond the side face of the eccentric ring.

4. Eccentric bearing as claimed in claim 1, wherein said adjustment lever is connected, via a roller bearing, to an end of the link pin projecting beyond the side face of the eccentric ring.

5. Eccentric bearing as claimed in claim 1, wherein said tie bolt is a threaded screw that threadably engages an end of the link pin.

6. Eccentric bearing as claimed in claim 5, wherein said adjustment lever is connected, via a roller bearing, to an end of the link pin projecting beyond the side face of the eccentric ring.

7. Eccentric bearing comprising:

an intermediately located eccentric ring provided with a bore, a portion of the bore being conically shaped;

two rows of roller elements arranged radially inwardly and radially outwardly of the eccentric ring;

a link pin positioned in the bore in the eccentric ring, the link pin having a conically shaped mantle surface;

an adjustment lever mounted on the link pin and positioned adjacent one side surface of the eccentric ring; and means for axially fixing the link pin in the bore in the eccentric ring so that the conically shaped mantle surface of the link pin engages the conically shaped portion of the bore in the eccentric ring.

8. Eccentric bearing as claimed in claim 7, wherein said means for axially fixing includes a tie bolt.

9. Eccentric bearing as claimed in claim 8, wherein said tie bolt is a threaded screw that threadably engages an end of the link pin.

10. Eccentric bearing as claimed in claim 8, wherein said link pin is inserted into the bore from one side of the eccentric ring and the tie bolt is inserted into the bore from a side of the eccentric ring opposite said one side of the eccentric ring.

11. Eccentric bearing as claimed in claim 8, wherein said adjustment lever is connected, via a roller bearing, to an end of the link pin projecting beyond the side face of the eccentric ring.

12. Eccentric bearing as claimed in claim 7, wherein said adjustment lever is connected, via a roller bearing, to an end of the link pin projecting beyond the side face of the eccentric ring.

13. Eccentric bearing as claimed in claim 7, wherein said conically shaped portion of the bore in the eccentric ring extends axially through a portion of the eccentric ring.

14. Eccentric bearing as claimed in claim 13, wherein said bore in the eccentric ring includes a portion that extends from the conically shaped portion of the bore to the side face of the eccentric ring opposite said one side face.

* * * * *